United States Patent
Razack et al.

(10) Patent No.: US 9,565,183 B2
(45) Date of Patent: Feb. 7, 2017

(54) LOCATION AND DEVICE BASED STUDENT ACCESS CONTROL

(71) Applicant: Apollo Education Group, Inc., Phoenix, AZ (US)

(72) Inventors: Rajaa Mohamad Abdul Razack, Cupertino, CA (US); Pavan Aripirala Venkata, Fremont, CA (US); Sharad Gupta, Karnataka (IN); Raghunadha Konda, Karnataka (IN); Balaji Nidadavolu, Karnataka (IN)

(73) Assignee: Apollo Education Group, Inc., Phoenix, AZ (US)

( * ) Notice: Subject to any disclaimer, the term of this patent is extended or adjusted under 35 U.S.C. 154(b) by 0 days.

(21) Appl. No.: 14/657,936

(22) Filed: Mar. 13, 2015

(65) Prior Publication Data

US 2016/0269387 A1    Sep. 15, 2016

(51) Int. Cl.
G06F 17/30    (2006.01)
H04L 29/06    (2006.01)
H04W 4/02    (2009.01)

(52) U.S. Cl.
CPC ............. H04L 63/083 (2013.01); H04L 63/10 (2013.01); H04W 4/021 (2013.01)

(58) Field of Classification Search
None
See application file for complete search history.

(56) References Cited

U.S. PATENT DOCUMENTS

| 8,892,647 | B1 * | 11/2014 | Koulomzin | H04L 63/0876 709/204 |
| 9,231,940 | B2 * | 1/2016 | Counterman | H04L 63/0815 |
| 2007/0067444 | A1 * | 3/2007 | McCarty | H04L 67/14 709/224 |
| 2010/0100725 | A1 * | 4/2010 | Ozzie | G06F 21/43 713/155 |
| 2011/0158406 | A1 * | 6/2011 | Marcia | G06F 21/10 380/200 |
| 2011/0225625 | A1 * | 9/2011 | Wolfson | H04L 63/08 726/1 |
| 2012/0117637 | A1 * | 5/2012 | Little | H04L 63/0853 726/9 |

(Continued)

Primary Examiner — Farid Homayounmehr
Assistant Examiner — Olanrewaju Bucknor
(74) Attorney, Agent, or Firm — Hickman Palermo Becker Bingham LLP

(57) ABSTRACT

Techniques are described for controlling access to an online service by a one or more authentication mechanisms based on device, browser, or location, or a combination of the three. A method comprises receiving a request to access a service, receiving, in association with the request, a first access mechanism, receiving a first and second level of authentication associated with the user requesting the service, updating authenticated-mechanism data to indicate that the first access mechanism is an authenticated access mechanism for the particular user, receiving a second request to access the service, in response to receiving a second request, determining whether the second access mechanism is an authenticated access mechanism for the particular user, upon determining that the second access mechanism is not an authenticated mechanism, requesting a second level of authentication for the particular user, otherwise granting access.

18 Claims, 5 Drawing Sheets

(56) References Cited

U.S. PATENT DOCUMENTS

| | | | |
|---|---|---|---|
| 2012/0227098 A1* | 9/2012 | Obasanjo | H04L 63/0815 726/8 |
| 2014/0157381 A1* | 6/2014 | Disraeli | G06F 21/31 726/7 |
| 2015/0074801 A1* | 3/2015 | Koizumi | G06F 21/57 726/22 |
| 2016/0087957 A1* | 3/2016 | Shah | H04L 63/205 726/1 |
| 2016/0112437 A1* | 4/2016 | Churyumov | G06F 21/43 726/7 |

* cited by examiner

LOCATION AND DEVICE BASED STUDENT ACCESS CONTROL

FIELD OF THE INVENTION

The present invention relates to methods and systems for controlling access to online services, and in particular, for implementing access controls by means of geolocation and geofencing, as well as by only permitting access from a particular device/browser combination.

BACKGROUND

One way to restrict access to online content or services is to use username/password authentication. Username/password authentication is easily thwarted, however, when unauthorized users are told or otherwise obtain the username/password of authorized users.

In some online environments, such as online education, it is particularly important to ensure that the person using log-in credentials is the actual person that was provided those log-in credentials. For example, the integrity of tests that are administered online would be compromised if one student takes the test under another student's log-in credentials. Therefore, a need exists for an additional method of authentication that helps ensure that the person using an online service is the person that the online service believes is using the online service.

DETAILED DESCRIPTION

Figure 1:
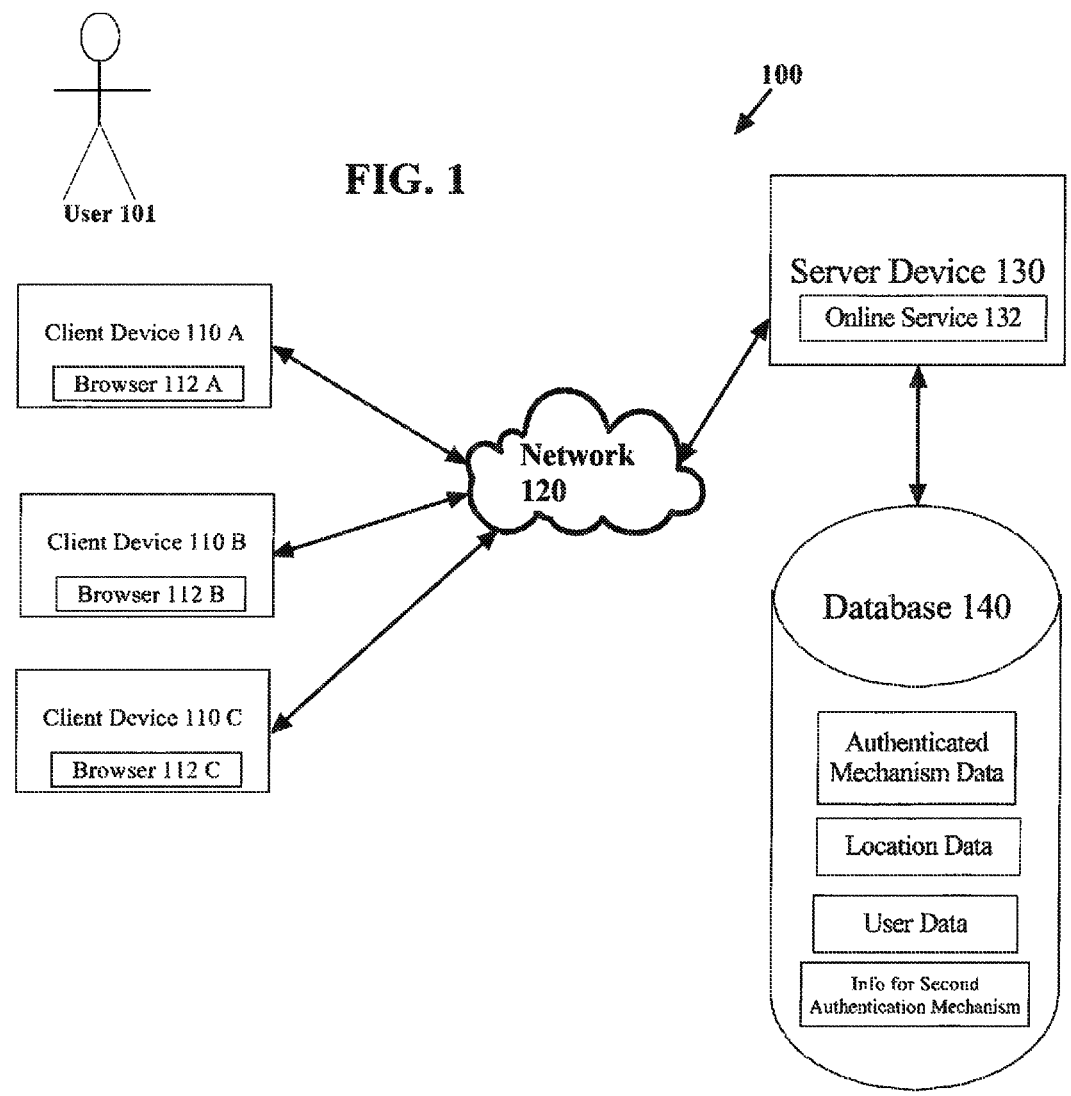
FIG. 1 is a block diagram that depicts an example network arrangement for a location and device based student access, according to embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods and systems are provided for controlling access to online activities, for example online exams and the like. A student can only be present in one place at a given time. They therefore cannot participate in two different online classroom activities at the same time. However, current authentication methods do not ensure that a student's identity has not been compromised. Additionally, an online activity provider may require a method of verifying that only the registered student—and not someone who possesses the login credentials—is participating in a given online classroom activity.

The administrator of an online service, for example an exam, may wish to restrict access to the service to a single device, a single device/browser combination, or a single device/browser/location combination To accomplish this, one or more access mechanisms can be defined. For example, an authentication mechanism can be a location access control, a device/browser access control, a user id/password control, or any other mechanism suitable for authenticating a user, In one embodiment, one or more access mechanisms can be combined to improve the authentication even further, by being arranged in levels—for example, one access mechanism can comprise the first authentication level, another access mechanism can comprise the second authentication level, and so on. If a student taking part in such an activity attempts to log in for a second time, using for example a different device, a second authentication mechanism is used to verify their identity to ensure the login is not fraudulent. If the student successfully confirms his identity by the second authentication mechanism, they can then be offered a choice between (a) being granted access to the activity on his current device (thereby ceasing activity on the previous device), or (b) continuing access on the previous device (thereby being denied login on the current device). Additionally, access may be controlled on the basis of comparing the time and location of an online session with the time and location of a previous session, and determining whether it is possible for a user to have traveled the distance between the location of the current session and the location of the previous session. If the travel is not possible, and the same user ID was used for both sessions, then the second session is not allowed to proceed.

Client/Server Architecture

Client devices 110A-110C may be implemented by any type of computing device that is communicatively connected to network 120. Example implementations of client devices 110A-110C include, without limitation, workstations, personal computers, laptop computers, personal digital assistants (PDAs), tablet computers, cellular telephony devices such as smart phones, and any other type of computing device.

In network arrangement 100, each of the client devices 110A-110C is configured with a respective web browser 112A-112C that may access tutoring service 132. Web browsers 112A-112C may be any web browser capable of running on the devices 110A-110C, such as Firefox, Safari, Chrome and so on. Client devices 110A-110C may be configured with other mechanisms, processes and functionalities, depending upon a particular implementation.

Further, client devices 110A-110C are each communicatively coupled to a display device (not shown in FIG. 1) for displaying graphical user interfaces. Such a display device may be implemented by any type of device capable of displaying a graphical user interface. Example implementations of a display device include a monitor, a screen, a touch screen, a projector, a light display, a display of a tablet computer, a display of a telephony device, a television, etc.

Network 120 may be implemented with any type of medium and/or mechanism that facilitates the exchange of information between client devices 110A-110C and server device 130. Furthermore, network 120 may facilitate use of any type of communications protocol, and may be secured or unsecured, depending upon the requirements of a particular embodiment.

Server device 130 may be implemented by any type of computing device that is capable of communicating with client devices 110A-110C over network 120. In a network arrangement 100, server device 130 is configured with an online service 132, which may be part of a cloud computing service. Functionality attributed to online service 132 may also be performed on client devices 110A-110C, according to embodiments. Server device 130 may be configured with other mechanisms, processes and functionalities, depending upon a particular implementation.

Server device 130 is communicatively coupled to database 140. As shown in FIG. 1, database 140 includes various data elements that can be used to tailor the online service 132 for the individual needs of each user at respective client devices 110A-110C, as discussed in further detail below, for example, authenticated mechanism data and associated information, location data, and user data. These various types of data are described in greater detail below. Database 140 may reside in any type of storage, including volatile and non-volatile storage (e.g., random access memory (RAM), one or more hard or floppy disks, main memory, etc.), and may be implemented by multiple logical databases. The storage on which database 140 resides may be external or internal to server device 130.

Any of browsers 112A-112C and online service 132 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication. Further, any of browsers 112A-112C and online service 132 may send one or more of the following over network 120 to one of the other entities: information via HTTP, HTTPS, SMTP, etc.; XML data; SOAP messages; API calls; and other communications according to embodiments.

In an embodiment, each of the processes described are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Authentication Mechanism Configuration

Figure 2:
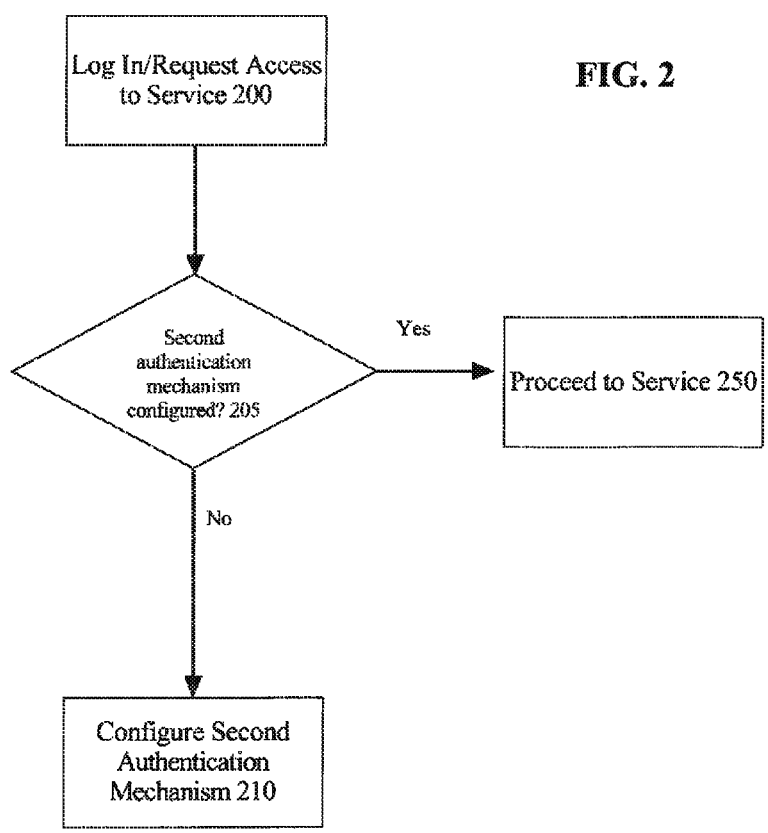
FIG. 2 depicts a flow chart showing the initial registration and configuration of the challenge questions.

FIG. 2 is a flow chart that depicts initial registration and configuration of the second authentication mechanism. At step 200, a user 101 registers for access to an online service 132 using a first authentication mechanism, for example, a user name and password, or any other user authentication mechanism. The online classroom activity can be, for example, an exam, a tutorial, or any other kind of online activity.

At step 205, it is determined whether the user 101 has previously provided authentication information for a second authentication mechanism 230. This determination may be made, for example, by examining database 140 to determine if authentication information for the second authentication mechanism 230 has been associated with the user 101. Upon determining that authentication information for the second authentication mechanism has been associated with the user, the method proceeds to step 250 and permits access to the service.

Upon determining that authentication information for the second authentication mechanism has not been associated with the user, at step 210 the user 101 is prompted to for authentication information for the second authentication mechanism 230. For example, in the case where the second authentication mechanism is a "challenge question" system, the authentication information can comprise one or more challenge questions and associated responses. In one embodiment, the challenge questions can be pre-selected, and the user 101 can be prompted to provide answers thereto. In another embodiment, the challenge questions can also be written by the user, with the user also writing the responses thereto. Additionally, or alternatively, the second authentication mechanism can comprise a biometric identification device, a smart card, or any other authentication mechanism that can confirm the identity of the user 101. The second authentication method should be one that differs from the first authentication mechanism. The second authentication mechanism only needs to be configured once for each user. Once authentication information of a user has been obtained for the second access mechanism 230, the information can be permanently stored, for example on the database 140 and retrieved when necessary to confirm the identity of a user 101.

In one embodiment, an online activity can permit simultaneous access from different devices, or different browsers on the same device. If the online activity does not permit simultaneous access, the properly authenticated user is prompted to choose the device on which he or she wishes to participate in the online activity, and the other device is thereby logged out.

Device/Browser Authentication Mechanism

According to one embodiment, when a user attempts to obtain access to an online service, the online service determines whether the device/browser combination that is being used by the user is "known". For known device/browser combinations, authentication using a first authentication mechanism is sufficient. On the other hand, for unknown device/browser combinations, authentication using a second authentication mechanism, or both the first and second authentication mechanism, is required. In one embodiment, a device/browser combination is "known" relative to a user if that user has previously used that same device/browser combination to access the online service.

Figure 3:
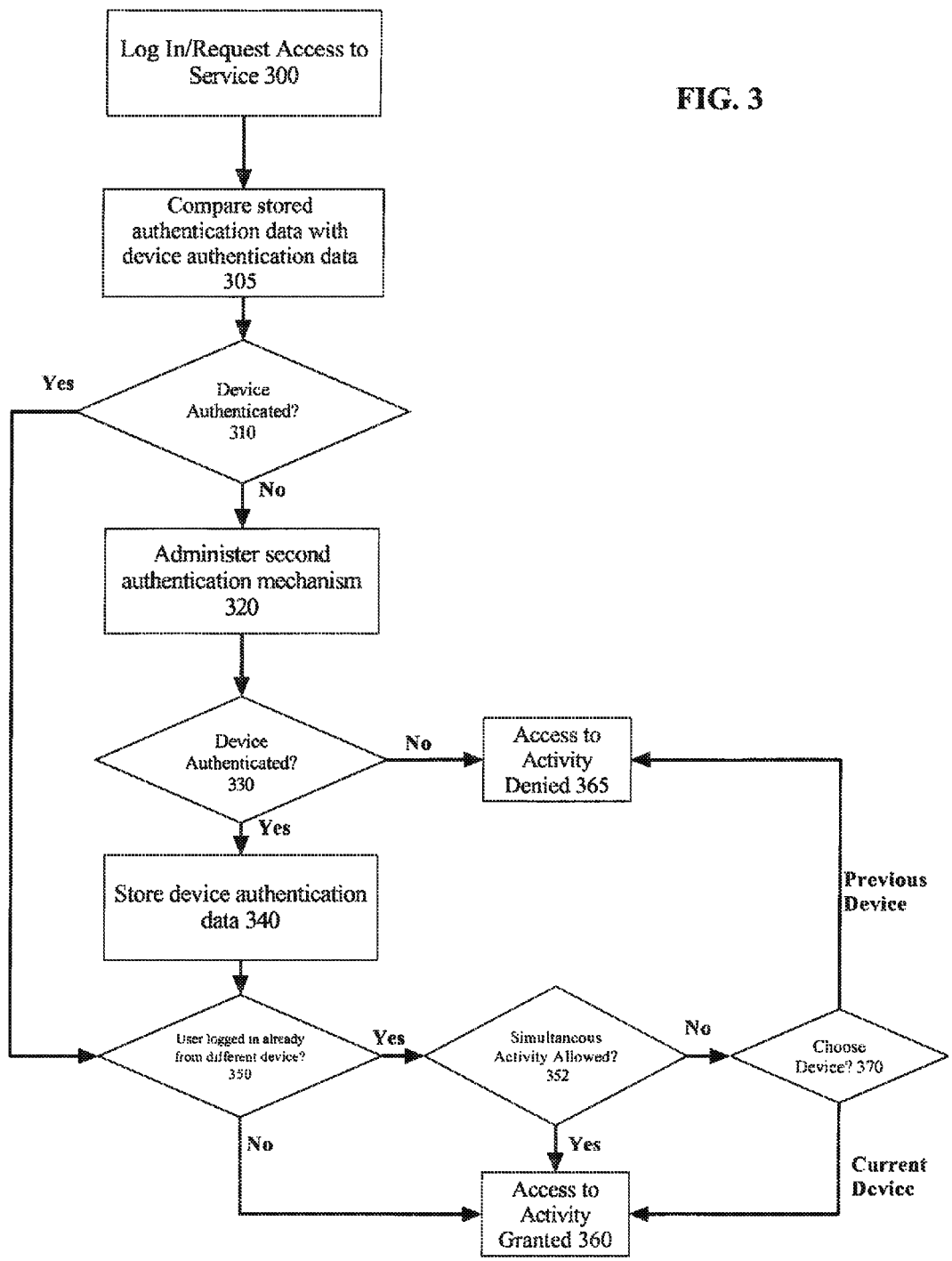
FIG. 3 depicts a flow chart showing device/browser based access control.

FIG. 3 is a flow chart that depicts the steps to determine whether to grant a user 101 access to an online service 132, where the authentication process takes into account the device/browser combination that is being used by the user 101. For the purpose of explanation, it shall be assumed that user 101 is using client device 110A and browser 112A to sign in to online service 132, and that device 110A/browser 112A are associated with a unique device/browser identifier (UDBI) of UDBI1. The UDBI can be a sequence of numbers, or letters, or any other identifier capable of uniquely identifying a particular device or device/browser combination. The UDBI can be stored, for example in the database 140 or any other kind of suitable storage device.

At step 300, user 101 logs in, providing the authentication information required by the first authentication mechanism (e.g. a userid/password). According to one embodiment, as part of the login step, the client device 110A sends to server device 130 the device/browser identifier UDBI1. At step 305, the server device 130 determines whether the device/browser combination that is being used by user 101 is a known device/browser combination for user 101. For example, service device 120 may compare UDBI1 with the UDBIs that are stored in the database 140 for previous sessions by the same user 101. Step 310 is a binary decision step. If UDBI1 matches any previously stored UDBIs for user 101, in other words, if the device/browser combination is one that the user 101 has used before, then the method proceeds to step 350.

If at step 310, the method determines that UDBI1 is not a known device/browser combination for user 101, then the method instead proceeds to step 320, wherein the user 101 is required to authenticate using a second authentication mechanism.

As detailed above, the second authentication mechanism can employ any authentication method, for example a set of one or more challenge questions, a biometric authentication method, or any other suitable authentication method. The second authentication method should differ from the first authentication method. If a user 101 is successfully authenticated by the second authentication mechanism at step 330, then the method proceeds to step 340. At step 340, the user 101 is asked whether the user desires the UDBI of the user's current device/browser combination to be stored. In response to an affirmative response at step 340, server device 130 stores UDBI1 in the database 140 in association with user 101. Alternative, at step 340, the user 101 may also choose to decline to tag the device/browser combination as a "known device" for user 101. This may occur, for example, if he is borrowing a friend's device, or if he is attempting to access the service 132 from a public computer.

At step 352, the server device 130 determines whether the service 132 that the user 101 wishes to access allows simultaneous access from multiple devices or multiple browsers on the same device. If the service 132 permits simultaneous access, at step 360, access is granted.

At step 350, if the service 132 does not permit simultaneous access from multiple devices or browsers, the method proceeds to step 370. At step 370, the user 101 is prompted to choose between continuing the activity on the previous device or the current device. If the user 101 chooses to continue the activity on the current device, the method advances to step 360 and access is granted. If the student chooses to continue the activity on the device he logged in from previously, the method proceeds to step 365 and access to the desired activity is denied.

Device Identifiers

In FIG. 3, an embodiment was described in which device/browser combinations were treated as "known" or "unknown", where unknown device/browser combinations require an additional level of authentication. In an alternative embodiment, the known/unknown determination may be performed at the device level, rather than the device/browser combination level. In such an embodiment, a device would be treated as "known" if the user had previously used the device to access the service, even if the previous access was performed using a different application than the user is currently using to access the service.

Location Access Control

Figure 4:
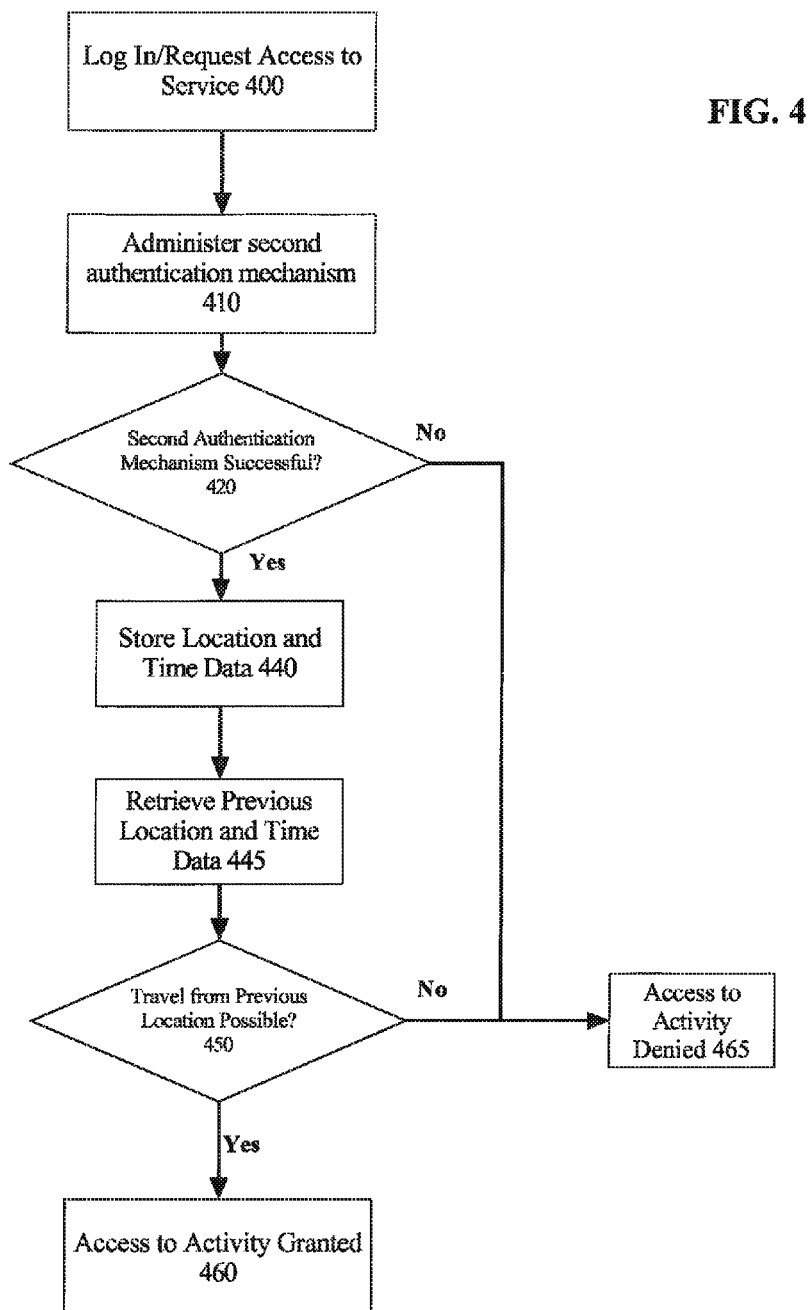
FIG. 4 depicts a flow chart showing location based access control.

FIG. 4 is a flow chart depicting a method of controlling access to an online activity on the basis of the location. As before, at step 400, the user 101 logs in and requests access to an online service 132 using a first authentication method, for example a conventional access credential such as a username and password. As before, a second authentication mechanism may be presented at step 410, for example if the device/browser identifier does not match any stored device/browser identifier for user 101.

Proceeding, at step 440, server device 130 obtains location information and time information pertaining to the current login. In one embodiment, server device 130 can obtain location information of the user device from the GPS system on the user device. In another embodiment, server device 130 the location information can be obtained from the IP address associated with the login, by querying the Internet Service Provider on the current location of the device, or any other suitable method of determining the current location. In one embodiment, the time information can be obtained from the system time of the server device 130. Server device 130 records the location and time information at the end of a session and stores the information in the database 140. At step 445, server device 130 retrieves location and time information recorded at the end of the previous login session. At step 450, the server device 130 determines whether the user 101 could have plausibly traveled from the location associated with the user's most recent session with the service to his current location in the time that has expired since the user's most recent session with the service. Step 450 can be performed, for example, by comparing the time and location of the current login to a time and location of the preceding login. Service device 130 may use a publicly available service, such as Google Maps, to determine how much time it takes for a person to travel between the two locations. If travel is determined to be feasible between the locations in the time that has lapsed between sessions, the method proceeds to step 460, permitting access to the online activity. If travel is determined to be unfeasible between the locations in the amount of time that lapsed between sessions, the method proceeds to step 465 and access is denied.

Referring back to step 450, in one embodiment the server device 130 can calculate the distance between the location of the current login and the location of the previous login using the HTML location data. In another embodiment, the server device 130 can determine the location of the device from the known location of a WiFi hotspots that the device is currently connected to. In another embodiment, the server device 130 can determine the location of the device from the known location of a cellular tower that the device is currently connected to. Server device 130 can then calculate the time elapsed between the current login and the previous login, by comparing the current system time with the system time recorded during the previous login. To determine whether travel between the locations is possible in the time elapsed, the server device 130 uses the distance and time elapsed values obtained to calculate an average speed, and compares the calculated speed value to a pre-defined plausible average speed value. If the calculated speed value is lower than the pre-defined average speed value, then travel between the locations is plausible.

In another embodiment, the server device 130 can calculate the distance between the location of the current login and the location of the previous login, and calculate the time elapsed between the current login and the previous login. To determine whether travel between the locations is possible in the time elapsed, the server device 130 uses the values obtained to calculate an average speed, and compares the calculated speed value to previously observed average speed values. If the calculated speed value is lower than the previously observed average speed values, then travel between the locations is plausible.

In another embodiment, the server device 130 can query a public travel site to obtain the travel time between the locations, using the location of the previous login as the point of departure, and the location of the current login as the point of arrival. Any suitable travel site such as Kayak, Travelocity, or the like may be utilized. Server device 130 can then determine whether travel between the locations is plausible by comparing the travel time obtained from the public travel site to the time elapsed between the current login and the previous login.

Device/Browser/Location Authentication

In another embodiment, the device/browser access control and location access control, as detailed above, can be combined to provide an additional level of authentication.

For example, a location-based access control could be administered following the device/browser authentication step. Additionally, or alternatively, the location-based access control could be administered before, or concurrently with, the device/browser authentication step.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
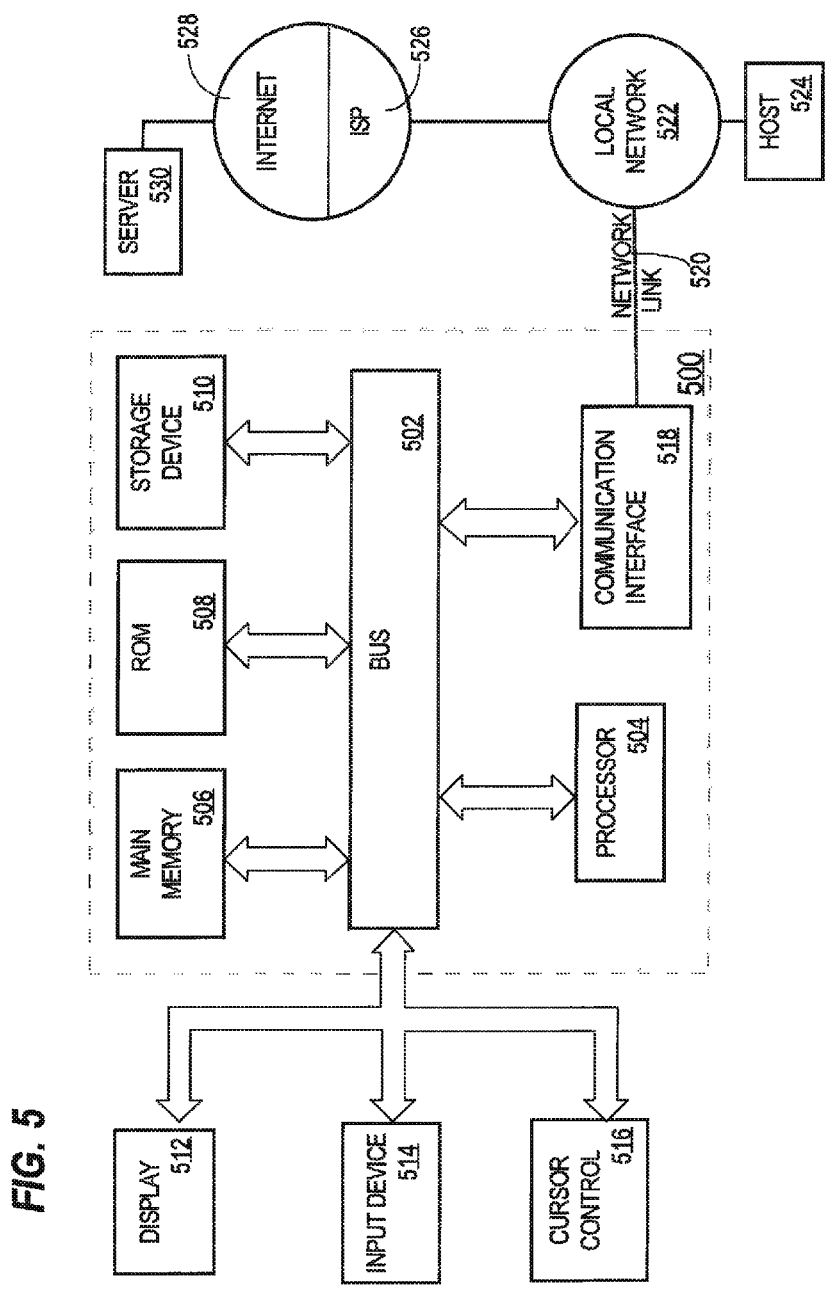
FIG. 5 is a block diagram of a computer system on which embodiments may be implemented.

For example, FIG. 5 is a block diagram that illustrates a computer system 600 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   selectively restricting a particular user's access to a service by:
   when the particular user is using an access mechanism with which the particular user previously performed two levels of authentication, allowing the particular user to access the service using a single level of authentication; and
   when the particular user is using an access mechanism with which the particular user did not previously perform two levels of authentication, allowing the particular user to access the service only after the particular user performs two levels of authentication using the access mechanism;
   wherein selectively restricting the particular user's access to the service comprises:
   maintaining, on a storage device, authenticated-mechanism data that indicates which access mechanisms are authenticated access mechanisms for the particular user;
   receiving, from a first access mechanism, a first request to access the service;
   receiving, in association with the first request, both a first level of authentication for the particular user and a second level of authentication for the particular user;
   in response to receiving, in association with the first request, both the first level of authentication for the particular user and the second level of authentication for the particular user, updating the authenticated-mechanism data to indicate that the first access mechanism is an authenticated access mechanism for the particular user;
   receiving from a second access mechanism, a second request to access the service;
   receiving, in association with the second request, the first level of authentication for the particular user;
   in response to receiving the second request and, in association with the second request, the first level of authentication for the particular user, performing the steps of:
   determining, based on the authenticated-mechanism data, whether the second access mechanism is an authenticated access mechanism for the particular user;
   responsive to the second access mechanism being an authenticated access mechanism for the particular user, allowing the second access mechanism to access the service without receiving, in association with the second request, the second level of authentication for the particular user; and
   responsive to the second access mechanism not being an authenticated access mechanism for the particular user, allowing the second access mechanism to access the service only after the second level of authentication for the particular user is provided in association with the second request;
   wherein the first and second access mechanisms are one of:
   first and second devices;
   a first combination of device and browser and a second combination of device and browser; or
   a first combination of device, browser and location and a second combination of device, browser and location.

2. The method of claim 1 wherein the first and second access mechanisms are first and second devices.

3. The method of claim 1 wherein the first and second access mechanisms are first combination of device and browser and second combination of device and browser.

4. The method of claim 1 wherein the first and second access mechanisms are first combination of device, browser and location and second combination of device, browser and location.

5. The method of claim 1 further comprising:
   receiving the second level of authentication for the particular user in association with the second request; and
   in response to receiving the second level of authentication for the particular user in association with the second request, updating the authenticated-mechanism data to indicate that the second access mechanism is an authenticated access mechanism for the particular user.

6. A method comprising:
   maintaining, on a storage device, authenticated-mechanism data that indicates which access mechanisms are authenticated access mechanisms for a particular user;
   receiving, from a first access mechanism, a first request to access a service;
   receiving, in association with the first request, both a first level of authentication for the particular user and a second level of authentication for the particular user;
   in response to receiving, in association with the first request, both the first level of authentication for the particular user and the second level of authentication for the particular user, updating the authenticated-mechanism data to indicate that the first access mechanism is an authenticated access mechanism for the particular user;
   receiving from a second access mechanism, a second request to access the service;
   receiving, in association with the second request, the first level of authentication for the particular user;

in response to receiving the second request and, in association with the second request, the first level of authentication for the particular user, performing the steps of:
   determining, based on the authenticated-mechanism data, whether the second access mechanism is an authenticated access mechanism for the particular user;
   responsive to the second access mechanism being an authenticated access mechanism for the particular user, allowing the second access mechanism to access the service without receiving, in association with the second request, the second level of authentication for the particular user, wherein allowing the second access mechanism to access the service comprises allowing the second access mechanism to be used to participate in a particular activity;
while the second access mechanism is being used to participate in the particular activity, receiving from a third access mechanism, a third request to participate in the particular activity;
receiving, in association with the second request, the first level of authentication for the particular user;
in response to receiving the second request and, in association with the second request, the first level of authentication for the particular user, performing the steps of:
   detecting that the particular user is already participating in the particular activity using the second access mechanism;
   in response to detecting that the particular user is already participating in the particular activity using the second access mechanism, performing one of:
      preventing the particular user from participating in the particular activity using the third access mechanism; or
      requiring the particular user to select which access mechanism, of the second access mechanism and the third access mechanism, the particular user is to use to participate in the particular activity; and
responsive to the second access mechanism not being an authenticated access mechanism for the particular user, allowing the second access mechanism to access the service only after the second level of authentication for the particular user is provided in association with the second request;
wherein the first and second access mechanisms are one of:
   first and second devices;
   a first combination of device and browser and a second combination of device and browser; or
   a first combination of device, browser and location and a second combination of device, browser and location.

7. The method of claim 6 wherein, in response to detecting that the particular user is already participating in the particular activity using the second access mechanism, the particular user is prevented from participating in the particular activity using the third access mechanism.

8. The method of claim 6 wherein, in response to detecting that the particular user is already participating in the particular activity using the second access mechanism, the particular user is required to select which access mechanism, of the second access mechanism and the third access mechanism, the particular user is to use to participate in the particular activity.

9. The method of claim 6 wherein:
the service makes available a first set of activities for which simultaneous access by a single user is permitted, and a second set of activities for which simultaneous access by a single user is not permitted; and
the particular activity belongs to the second set of activities.

10. A system comprising:
one or more processors; and
a storage storing instructions which, when executed by the one or more processors, cause the one or more processors to perform operations comprising:
   selectively restricting a particular user's access to a service by:
      when the particular user is using an access mechanism with which the particular user previously performed two levels of authentication allowing the particular user to access the service using a single level of authentication; and
      when the particular user is using an access mechanism with which the particular user did not previously perform two levels of authentication, allowing the particular user to access the service only after the particular user performs two levels of authentication using the access mechanism;
   wherein selectively restricting the particular user's access to the service comprises:
      maintaining, on a storage device, authenticated-mechanism data that indicates which access mechanisms are authenticated access mechanisms for the particular user;
      receiving, from a first access mechanism, a first request to access the service;
      receiving, in association with the first request, both a first level of authentication for the particular user and a second level of authentication for the particular user;
      in response to receiving, in association with the first request, both the first level of authentication for the particular user and the second level of authentication for the particular user, updating the authenticated-mechanism data to indicate that the first access mechanism is an authenticated access mechanism for the particular user;
      receiving from a second access mechanism, a second request to access the service;
      receiving, in association with the second request, the first level of authentication for the particular user;
      in response to receiving the second request and, in association with the second request, the first level of authentication for the particular user, performing the steps of:
         determining, based on the authenticated-mechanism data, whether the second access mechanism is an authenticated access mechanism for the particular user;
         responsive to the second access mechanism being an authenticated access mechanism for the particular user, allowing the second access mechanism to access the service without receiving, in association with the second request, the second level of authentication for the particular user; and
         responsive to the second access mechanism not being an authenticated access mechanism for the particular user, allowing the second access mechanism to access the service only after the second level of authentication for the particular user is provided in association with the second request;

wherein the first and second access mechanisms are one of:
first and second devices;
a first combination of device and browser and a second combination of device and browser; or
a first combination of device, browser and location and a second combination of device, browser and location.

11. The system of claim 10 wherein the first and second access mechanisms are first and second devices.

12. The system of claim 10 wherein the first and second access mechanisms are first combination of device and browser and second combination of device and browser.

13. The system of claim 10 wherein the first and second access mechanisms are first combination of device, browser and location and second combination of device, browser and location.

14. The system of claim 10 wherein the storage storing instructions which, when executed by the one or more processors, cause the one or more processors to perform operations further comprising:
receiving the second level of authentication for the particular user in association with the second request; and
in response to receiving the second level of authentication for the particular user in association with the second request, updating the authenticated-mechanism data to indicate that the second access mechanism is an authenticated access mechanism for the particular user.

15. A system comprising:
one or more processors; and
a storage storing instructions which, when executed by the one or more processors, cause the one or more processors to perform operations comprising:
maintaining, on a storage device, authenticated-mechanism data that indicates which access mechanisms are authenticated access mechanisms for a particular user;
receiving, from a first access mechanism, a first request to access a service;
receiving, in association with the first request, both a first level of authentication for the particular user and a second level of authentication for the particular user;
in response to receiving, in association with the first request, both the first level of authentication for the particular user and the second level of authentication for the particular user, updating the authenticated-mechanism data to indicate that the first access mechanism is an authenticated access mechanism for the particular user;
receiving from a second access mechanism, a second request to access the service;
receiving, in association with the second request, the first level of authentication for the particular user;
in response to receiving the second request and, in association with the second request, the first level of authentication for the particular user, performing the steps of:
determining, based on the authenticated-mechanism data, whether the second access mechanism is an authenticated access mechanism for the particular user;
responsive to the second access mechanism being an authenticated access mechanism for the particular user, allowing the second access mechanism to access the service without receiving, in association with the second request, the second level of authentication for the particular user, wherein allowing the second access mechanism to access the service comprises allowing the second access mechanism to be used to participate in a particular activity;
while the second access mechanism is being used to participate in the particular activity, receiving from a third access mechanism, a third request to participate in the particular activity;
receiving, in association with the second request, the first level of authentication for the particular user;
in response to receiving the second request and, in association with the second request, the first level of authentication for the particular user, performing the steps of:
detecting that the particular user is already participating in the particular activity using the second access mechanism;
in response to detecting that the particular user is already participating in the particular activity using the second access mechanism, performing one of:
preventing the particular user from participating in the particular activity using the third access mechanism; or
requiring the particular user to select which access mechanism, of the second access mechanism and the third access mechanism, the particular user is to use to participate in the particular activity; and
responsive to the second access mechanism not being an authenticated access mechanism for the particular user, allowing the second access mechanism to access the service only after the second level of authentication for the particular user is provided in association with the second request;
wherein the first and second access mechanisms are one of:
first and second devices;
a first combination of device and browser and a second combination of device and browser; or
a first combination of device, browser and location and a second combination of device, browser and location.

16. The system of claim 15 wherein, in response to detecting that the particular user is already participating in the particular activity using the second access mechanism, the particular user is prevented from participating in the particular activity using the third access mechanism.

17. The system of claim 15 wherein, in response to detecting that the particular user is already participating in the particular activity using the second access mechanism, the particular user is required to select which access mechanism, of the second access mechanism and the third access mechanism, the particular user is to use to participate in the particular activity.

18. The system of claim 15 wherein:
the service makes available a first set of activities for which simultaneous access by a single user is permitted, and a second set of activities for which simultaneous access by a single user is not permitted; and
the particular activity belongs to the second set of activities.

* * * * *